D. D. & H. W. TILBURY.
TRACTION WHEEL.
APPLICATION FILED FEB. 7, 1914.
1,104,847.
Patented July 28, 1914.
3 SHEETS—SHEET 1.
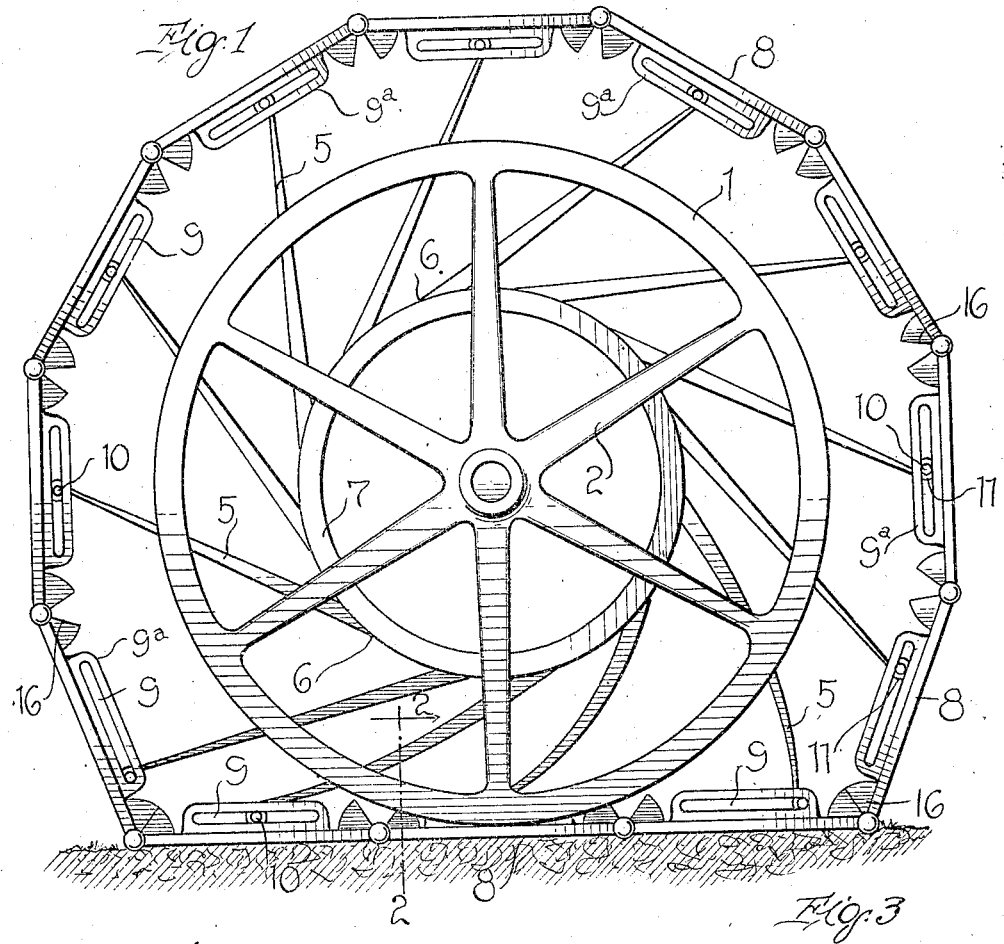
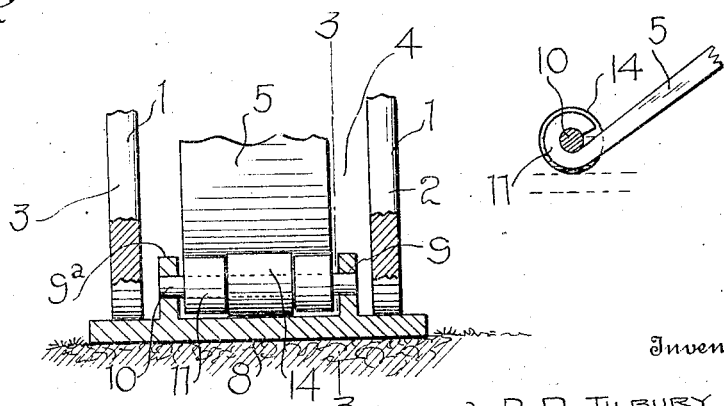
Inventors
D. D. Tilbury
H. W. Tilbury
By Watson E. Coleman
Attorney
Witnesses
Robert M. Sutphen
A. L. Hind

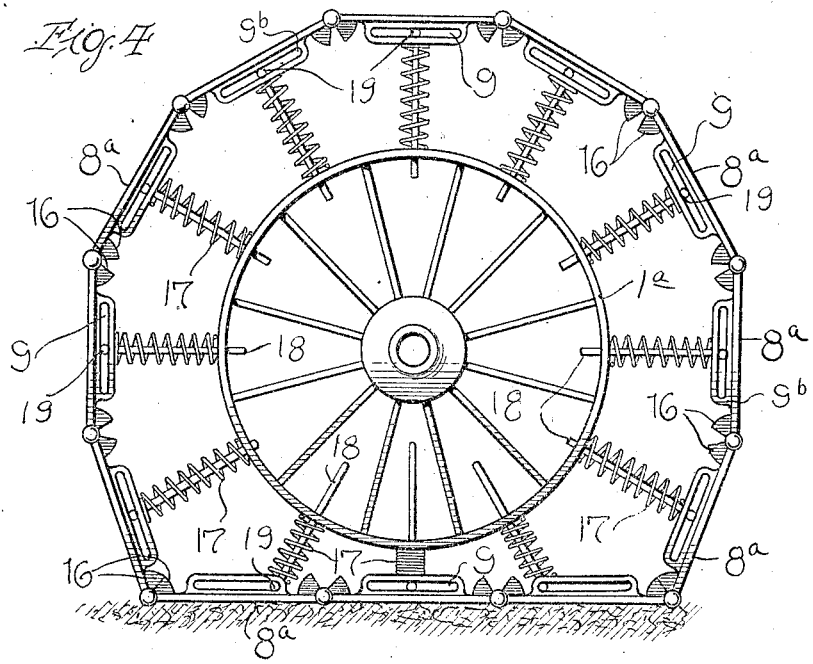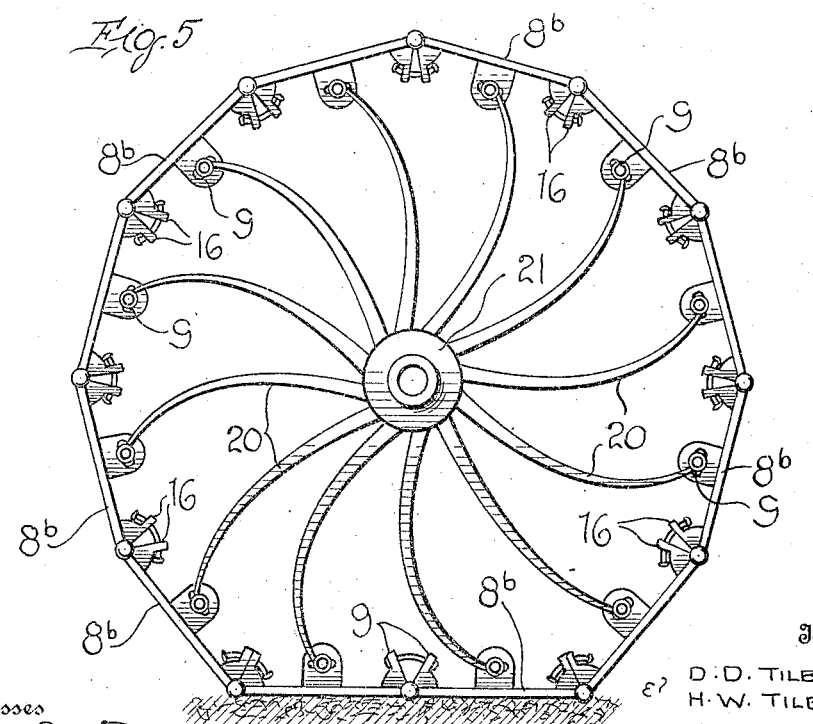

D. D. & H. W. TILBURY.
TRACTION WHEEL.
APPLICATION FILED FEB. 7, 1914.
1,104,847.
Patented July 28, 1914.
3 SHEETS—SHEET 3.
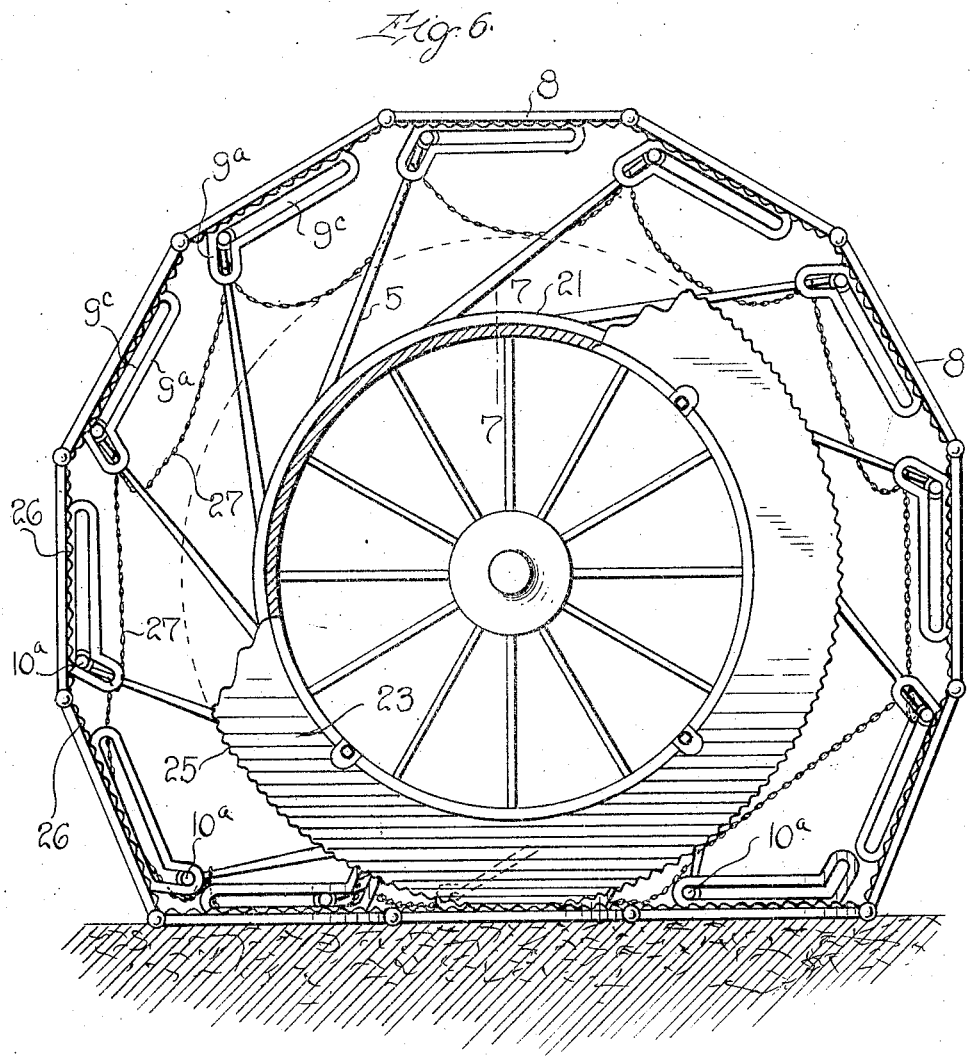
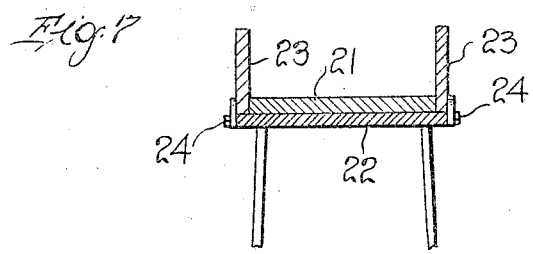
Witnesses
Robert M. Sutphen
A. S. Hind
Inventors
D. D. Tilbury
H. W. Tilbury
By Watson E. Coleman
Attorney

UNITED STATES PATENT OFFICE.

DARIUS D. TILBURY AND HENRY W. TILBURY, OF LONOKE, ARKANSAS.

TRACTION-WHEEL.

1,104,847.　　　Specification of Letters Patent.　　Patented July 28, 1914.

Application filed February 7, 1914. Serial No. 817,331.

*To all whom it may concern:*

Be it known that we, DARIUS D. TILBURY and HENRY W. TILBURY, citizens of the United States, residing at Lonoke, in the county of Lonoke and State of Arkansas, have invented certain new and useful Improvements in Traction-Wheels, of which the following is a specification, reference being had to the accompanying drawings.

This invention relates to certain improvements in traction wheels and has for its object to provide a device of this general character having novel and improved means whereby such wheel automatically provides a track over which it may be caused to travel.

The invention also has for its object to provide a novel and improved device of this general character including a rim comprising a plurality of operatively connected straight sections adapted to afford an elongated contact with the surface over which the wheel is traveling whereby such wheel may advance with a minimum of resistance.

The invention consists in the details of construction and in the combination and arrangement of the several parts of our improved traction wheel, whereby certain important advantages are attained and the device is rendered simpler, less expensive and otherwise more convenient and advantageous for use, all as will be hereinafter more fully set forth.

The novel features of the invention will be carefully defined in the appended claims.

In order that our invention may be the better understood, we will now proceed to describe the same with reference to the accompanying drawings, wherein—

Figure 1 is a view in side elevation of a wheel constructed in accordance with an embodiment of our invention; Fig. 2 is a sectional view taken substantially on the line 2—2 of Fig. 1; Fig. 3 is a sectional view taken substantially on the line 3—3 of Fig. 2; Fig. 4 is a view similar to Fig. 1, but illustrating a further embodiment of our invention; Fig. 5 is a view similar to Fig. 4, but illustrating a still further form of our invention. Fig. 6 is a view similar to Fig. 1, but illustrating a still further embodiment of our invention; and Fig. 7 is a fragmentary sectional view taken on the line 7—7 of Fig. 6.

As disclosed in Figs. 1 to 3 of the accompanying drawings, 1 denotes a wheel of any desired dimension and comprising the spaced alined sections 2 and 3, affording therebetween a peripheral groove or channel 4, through which are adapted to project the tensioning elements 5, herein disclosed as flat spring members of requisite strength, suitably anchored, as at 6, to the annular member 7 interposed between the sections 2 and 3 and suitably anchored thereto. It is preferred that the tensioning elements 5 be disposed tangentially of the annular member 7, for reasons which will be self-evident.

The outer extremity of each of the tensioning elements 5 is adapted to be operatively connected with a flat section 8 of the flexible rim or track disposed around the wheel 1 and, as herein disclosed, such section is provided on its under surface with the longitudinally directed spaced plates $9^a$ provided with the elongated slots 9, through which is projected the extremities of a cross shaft or pin 10, suitably supported by the free extremity of such tensioning element 5. While any means for creating this connection between the shaft or pin 10 and the section 8 may be employed, we have found the arrangement disclosed in the accompanying drawings to be of particular advantage and wherein the longitudinal marginal portions of the flat spring, at its outer extremity, are projected and coiled upon itself to afford a suitable mounting, as indicated at 11. The extent of the projected portions 11 is such as to permit the positioning on such pin or shaft 10, intermediate the projections 11, the roller bearing 14 which is adapted to contact with the inner face of the section 8 whereby it will be readily perceived that the requisite movement of the outer extremity of the tensioning element 5 may be created with a minimum of friction and without undue wear upon the end portions of the pin or shaft projected through the slots 9.

As is clearly shown in Fig. 1 of the drawings, it will be observed that the position of the sections 8 of the flexible rim or track relative to the wheel 1, is such that the tensioning elements 5 are capable of such depression as to permit at least three of such sections 8 to fully contact with the surface over which the same is adapted to pass whereby it is assured at all times that the rim or track will be properly laid in advance of the wheel 1. It will be further observed that this arrangement is further provided for through the structure whereby the connection between the tensioning elements 5 and the sections is variable. We also find it of advantage to provide means whereby the relative movement of the sections 8, when free of the surface over which the wheel is adapted to pass, may be limited in one direction in order that the inoperative portions of the flexible rim may be maintained in proper relation with the wheel 1 and, as herein disclosed, we accomplish this purpose by having projecting inwardly from the opposed ends of the sections and to either side of the hinged connection 15, the lips or flanges 16 disposed on such an inclination that the contact one with the other results in maintaining the inoperative portions of the rim or track substantially concentric with the wheel 1.

We do not wish to be understood as limiting ourselves in any way as to the character of the tensioning elements which may be employed. Hereinbefore we have disclosed the tensioning elements as comprising flat springs of requisite strength but we have found in practice that in lieu of this form of spring suitable coil springs may be employed, as is illustrated in Fig. 4, wherein it will be observed that such coil springs 17 surround the guiding stem 18 loosely directed through the felly or rim of the wheel 1$^a$, the outer extremity of each of such guiding stems 18 being provided with a laterally disposed arm 19 projecting through the slots 9 of the plates 9$^b$, as is believed to be clearly shown in the accompanying drawings. We have also found in practice that under certain conditions, the conventional wheel may be entirely dispensed with, as is disclosed in Fig. 5, and wherein the tensioning members 20 constitute spokes and are suitably anchored directly to the hub 21, the connection of these spokes 20 with the rim sections 8$^b$ is similar as has been disclosed with reference to the tensioning elements 5. While in this latter embodiment of our invention we have specified the tensioning members or spokes as secured directly to the hub, it may be well to state that in all forms the wheel member serves substantially as a hub and by the recitation of such an element in the appended claims, we wish to be understood as including any member to which the inner extremities of the tensioning means may be secured.

The form of invention as illustrated by Figs. 6 and 7 in the accompanying drawings is somewhat similar to the disclosure in Figs. 1 and 2 except the slots 9$^c$ in the plates 9$^a$ are angularly disposed, as clearly illustrated in the drawings in order that a greater movement of the shafts or pins 10$^a$ may be had, as is believed to be self-evident. We also find it of advantage in this form of invention to have the springs 5$^a$ suitably secured at their inner extremities to the band 21 surrounding the felly 22 whereby such felly is free to turn. We also find it of advantage to employ the rims 23 projecting from the periphery of the felly 22 and being suitably connected thereto, as indicated at 24. The particular manner in which the rims or flanges 23 may be secured to the felly 22 forms no particular part of our invention and it is therefore thought that the disclosure in the drawings is sufficient. We also find it of advantage to have the periphery 25 of the rims or flanges 23 toothed and adapted to intermesh with suitable toothed plates 26 properly positioned on the flat sections 8, whereby it will be seen that greater efficiency will result.

In order to prevent the springs 5, or more particularly the outer ends thereof, from separating to a too great extent when passing from under the wheel proper and to cause the spring to take its place when backing up, we find it of advantage to connect the outer extremities of such springs 5 by the members 27, herein shown as chains although we do not wish to be understood as limiting ourselves to this particular form.

From the foregoing, it is thought to be obvious that a traction wheel constructed in accordance with our invention is of an extremely simple and comparatively inexpensive nature and is particularly well adapted for use by reason of the convenience and facility with which it may travel over its supporting surface and it will also be obvious that our invention is susceptible of some change and modification without material departure from the principles and spirit thereof and for this reason we do not wish to be understood as limiting ourselves to the precise arrangement and formation of the several parts herein shown in carrying out our invention in practice.

While it will be obvious that a traction wheel constructed in accordance with our invention may travel over any character of surface, it is particularly advantageous for use in such localities where the supporting surface or ground is soft.

Having thus fully described our invention what we desire to claim and secure by Letters Patent is:

1. A device of the character described including a hub, a band surrounding such hub and capable of movement independently thereof, a flexible rim disposed around the hub and band and comprising a plurality of relatively movable sections, and a tensioning connection between the band and each of the sections.

2. A device of the character described including a hub, a band surrounding such hub and capable of movement independently thereof, a flexible rim disposed around the hub and band and comprising a plurality of relatively movable sections, a tensioning connection between the band and each of the sections, and rims disposed at opposite sides of the band connected to the hub and adapted to engage the inner surfaces of the sections.

3. A device of the character described including a hub, a band surrounding such hub and capable of movement independently thereof, a rim disposed around the hub, tensioning connections between the band and the rim, and rims disposed at opposite sides of the band and connected to the hub.

4. A device of the character described including a hub, a band surrounding such hub and capable of movement independently thereof, a rim disposed around the hub, tensioning connections between the band and the rim, and rims disposed at opposite sides of the band and connected to the hub, the inner face of the first mentioned rim and the periphery of the second mentioned rims being toothed and adapted to intermesh.

5. A device of the character described including a hub, a flexible rim disposed therearound and comprising a plurality of relatively movable sections, longitudinally directed spaced plates carried by each of such sections provided with longitudinally disposed slots, and a tensioning member interposed between the hub and each of such sections, such tensioning member having its outer extremity provided with means projected through the slots of the plates whereby such extremity may have movement independently of the sections.

In testimony whereof we hereunto affix our signatures in the presence of two witnesses.

DARIUS D. TILBURY.
    HENRY W. TILBURY.

Witnesses:
 J. E. MUZZY,
 W. J. BURGE.